(12) United States Patent
Campbell

(10) Patent No.: US 6,303,168 B1
(45) Date of Patent: Oct. 16, 2001

(54) METHOD AND APPARATUS FOR FORMING AND DIVIDING A DOUGH STREAM

(75) Inventor: Sterrett P. Campbell, Dunwoody, GA (US)

(73) Assignee: The Dominion Companies, LLC, Richmond, VA (US)

( * ) Notice: Subject to any disclaimer, the term of this patent is extended or adjusted under 35 U.S.C. 154(b) by 0 days.

(21) Appl. No.: 09/333,435

(22) Filed: Jun. 15, 1999

(51) Int. Cl.[7] .............................. A21C 5/00; A21D 6/00
(52) U.S. Cl. ..................... 426/496; 425/239; 425/240; 425/311; 426/503; 426/516; 426/517
(58) Field of Search .................... 426/503, 496, 426/516, 517, 518; 425/202, 239, 240, 311, 376.1, 382.3; 222/135, 144.5, 255, 266

(56) References Cited

U.S. PATENT DOCUMENTS

| 2,853,028 | * | 9/1958 | Hein | 425/240 |
| 4,332,538 | | 6/1982 | Campbell | 425/140 |
| 4,424,236 | | 1/1984 | Campbell | 426/231 |
| 4,449,908 | | 5/1984 | Campbell | 425/204 |
| 4,517,212 | | 5/1985 | Campbell | 426/496 |
| 4,661,364 | | 4/1987 | Campbell | 426/496 |
| 4,948,611 | | 8/1990 | Cummins | 426/503 |
| 4,960,601 | | 10/1990 | Cummins | 426/504 |
| 5,211,968 | * | 5/1993 | Judex | 425/240 |
| 5,264,232 | | 11/1993 | Campbell | 426/503 |
| 5,283,074 | | 2/1994 | Campbell | 426/496 |
| 5,350,290 | | 9/1994 | Honings | 425/311 |
| 5,356,652 | | 10/1994 | Campbell | 426/503 |
| 5,443,854 | | 8/1995 | Cummins | 426/231 |
| 5,479,847 | * | 1/1996 | Powers et al. | 222/255 |
| 5,516,272 | | 5/1996 | Cummins | 425/145 |
| 5,750,169 | | 5/1998 | Rose et al. | 426/231 |

* cited by examiner

Primary Examiner—George C. Yeung
(74) Attorney, Agent, or Firm—Thomas, Kayden, Horstemeyer & Risley

(57) ABSTRACT

A preferred method of the present invention includes the steps of: (1) providing a mass of dough; (2) providing a length of dough delivery conduit; (3) detaching a first portion of dough from the mass of dough; (4) delivering the first portion of dough into the dough delivery conduit; (5) detaching a second portion of dough from the mass of dough; (6) delivering the second portion of dough into the dough delivery conduit to form a stream of dough within the dough delivery conduit; (7) passing the stream of dough toward a dough piercing sharp for dividing the stream of dough, and; (8) forming the stream of dough into a plurality of dough pieces. Preferably, the step of delivering the portions of dough comprises utilizing a piston.

11 Claims, 13 Drawing Sheets

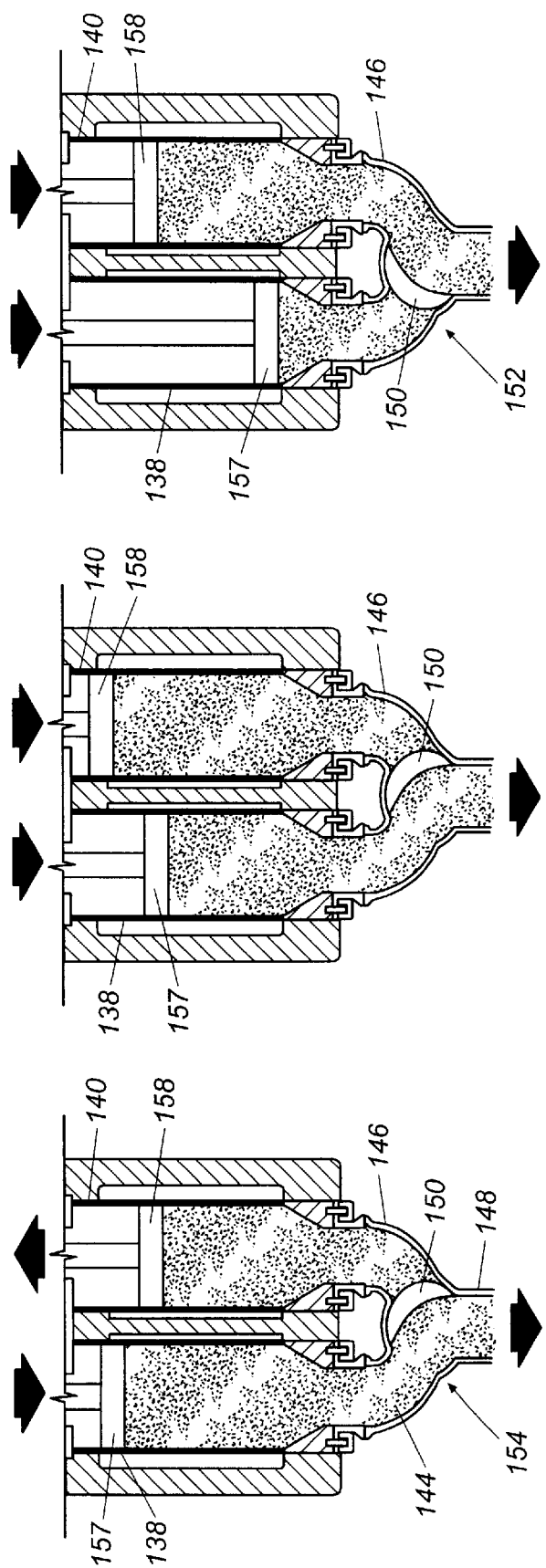

METHOD AND APPARATUS FOR FORMING AND DIVIDING A DOUGH STREAM

BACKGROUND OF THE INVENTION

1. Field of the Invention

The present invention relates to the processing of bakers' dough. More specifically, the invention relates to processing methods and systems for forming and dividing a dough stream that are particularly well suited for the processing of specialty dough, for example.

2. Description of the Related Art

In a typical commercial bread making process for the manufacture of fine grain bread products, i.e. white bread, hamburger buns, etc, baker's dough, which is primarily made of flour and water, is blended in a large mixer. A particularly high water content usually is desirable in the dough composition formed in the mixer because a high water content tends to make a softer baked product (approximately 60 pounds of water per 100 pounds of flour is common for fine grain bread products). Gluten, which is a component of flour, absorbs and retains the water so that a dough of a sticky, paste-like consistency is made. After mixing, the sticky dough typically is then transferred to a stuffing pump which forms the dough into a moving bar or stream of dough that passes through a conduit to dough processing equipment. The processing equipment can include, among others, a dough distribution manifold which distributes the stream of dough into multiple streams of dough, a dough divider which continually divides the dough streams into pieces of dough of equal volume and deposits the dough pieces in multiple columns of dough pieces onto a moving belt of a surface conveyor for further processing along a processing path.

Extrusion-type dividers, such as described in U.S. Pat. Nos. 5,356,652, 5,270,070, 5,264,232, 4,948,611, 4,424,263 and 4,332,538, for instance, for dividing dough streams into dough pieces are well known in the prior art and typically utilize vacuum pressure to draw dough into the divider and either a single or a double screw to deliver the dough through dough conduit to a metering pump. The metering pump runs at constant speed and provides a volumetrically consistent stream of dough which is then chopped off into dough pieces of equal volume. By utilizing these extrusion-type dividers, the formation of bread-sized dough pieces (dough pieces with a scaling weight of approximately 18–32 ounces) at a rate of 200 dough pieces per minute is not uncommon.

After baker's dough has been mixed, the dough begins to develop $CO_2$ and begins to expand or rise as it ages. As the dough is being handled by the aforementioned processing equipment, it is important that the gluten structure of the dough not be allowed to deteriorate, such as can occur by shearing, tearing, stretching or maintaining the dough at elevated pressures for prolonged periods of time. Maintaining a pliable gluten structure provides a final product which has a uniform grain structure with the gluten structure forming the walls of small pockets that trap the $CO_2$ gas being formed within the dough, and the walls providing the tight, even grain structure desired for fine grain bread products. However, in a typical commercial bread making process for the manufacture of specialty dough products, i.e. hard rolls, pumpernickel, frozen doughs, etc, processing dough in the aforementioned manner produces an inferior product and has been considered unsuitable.

Heretofore, specialty dough products typically are manufactured by a process known as ram and shear. As shown in FIGS. 1A–1C, a typical ram and shear system 500 incorporates a hopper 502 containing a mass of dough to be processed 504 (50 pounds of water per 100 pounds of flour in the dough is common), and a blade or shear 506 that reciprocates across the bottom of the hopper between a retracted position 508 (FIG. 1C), where the bottom of the hopper is opened, and a cutting position 510 (FIG. 1A), where the bottom of the hopper is closed. A cavity 512 is provided beneath the shear 506, and a ram 514 is provided for reciprocating within the cavity. A block 516 cooperates with the cavity 512 and includes a dough-receiving cylinder 518 and a piston 520 that are arranged opposite the ram 514. The block 516, and its cylinder 518 and piston 520 are movable between a dough-receiving position 522 (FIG. 1A), where the cylinder communicates with the cavity, and a dough-depositing position 524 (FIG. 1C), where dough 504 drawn into the cylinder is expelled by the piston onto a moving belt 526 of an endless belt-type conveyor, for instance.

In operation (FIG. 1A), the shear 506 is pushed to its cutting position 510, thereby closing the bottom of the hopper 502 and trapping a portion of dough in the cavity 512. The ram 514 is then pushed into the cavity (FIG. 1B) so that the dough trapped in the cavity is pushed into the cylinder of the block 518, which is oriented in its dough-receiving position 522. The ram 514 continues to push the dough from the cavity and into the cylinder until the piston 520 is forced against its stop 528, thereby ensuring that a pre-measured portion 530 of dough 504 is pressed into the cylinder. The block 516 then moves to its dough-depositing position 524 (FIG. 1C), where an upper portion of the block seals the cavity 512. The piston 520 then slides through the cylinder 518, pushing the pre-measured portion 530 of dough out of the cylinder and onto a moving belt 526 of an endless belt-type conveyor. As the dough portion 530 is being deposited onto the belt, the shear 506 pulls back to its retracted position 508, which opens the bottom of the hopper, and the ram 514 pulls bake, thereby drawing a vacuum which draws dough 504 from the hopper and down into the cavity 512 in front of the ram (FIG. 1A). This procedure is then repeated as necessary.

Some of the prior art ram and shear systems simultaneously operate multiple S pistons, i.e. 4–8 pistons, in order to increase dough piece output. However, the prior art ram and shear systems typically are limited to a maximum operating speed of approximately 25 strokes per minute, e.g. 100 dough pieces per minute for systems utilizing 4 pistons to 200 dough pieces per minute for systems utilizing 8 pistons.

In an effort to further increase the productivity of specialty bread manufacture, attempts have been made to produce specialty breads on modern extrusion-type dough processing equipment, e.g. equipment that provides a continuous flowing dough stream. However, processing specialty dough through an extrusion-type divider to produce a continuous flowing dough stream typically results in a final product that has an undesirable fine grain structure (which is very desirable in white breads, for instance), or has numerous other undesirable qualities, such as lacking in volume, having a shortened shelf life, etc. As a result, extrusion-type dough dividers have not, heretofore, been able to penetrate the market for specialty products.

Therefore, it is desirable to provide improved dough processing methods and systems which address these and other shortcomings of the prior art.

BRIEF SUMMARY OF THE INVENTION

Briefly stated, the present invention is directed to systems and methods for forming and dividing a dough stream from a mass of baker's dough. In particular, the present invention is capable of producing a continuous flowing dough stream that is well suited for the processing of specialty doughs. Preferred embodiments of the present invention utilize a piston to transform a mass of dough into a stream of dough. Additionally, the stream of dough can be volumetrically controlled and formed into a plurality of dough pieces of equal volume.

In a preferred embodiment, the system includes a hopper assembly incorporating a housing which is adapted to receive and store a mass of dough. A pump chamber communicates with the hopper assembly so that the mass of dough can be drawn from the housing and into the pump chamber. The pump chamber houses a first piston which is configured to reciprocate between a retracted position and an extended position, so that in its retracted position the mass of dough is drawn into the pump chamber and into engagement with the first piston. Then, in its extended position, a portion of the mass of dough is delivered into the dough delivery conduit, which communicates with the pump chamber, thereby forming a stream of dough within the dough delivery conduit from successively delivered portions of the mass of dough. Preferably, the stream of dough is then directed toward a first dough piercing sharp for further processing.

In some embodiments, a blocking member is arranged between the hopper assembly and the pump chamber, with the blocking member being movable between an open position and a closed position. In its open position, the blocking member is configured to allow a mass of dough to enter the pump chamber, while in its closed position, the blocking member is configured to prevent a mass of dough from entering the pump chamber. Preferably, a partial vacuum is maintained within at least a portion of the pump chamber so that, as dough passes by the blocking member and into the pump chamber, the dough is at least partially degassed by the partial vacuum.

In accordance with another aspect of the present invention, a preferred system includes first and second dough delivery conduits that each have a first end communicating with a pump chamber and second ends that communicate with each other. Preferably, first and second pistons are arranged within the pump chamber, with first piston configured to reciprocate between a first retracted position and a first extended position, and the second piston configured to reciprocate between a second retracted position and a second extended position. So configured, moving the first piston toward its first extended position delivers a first portion of dough, formed from a mass of dough, from the pump chamber and into the first dough delivery conduit. Likewise, moving the second piston toward its second extended position delivers a second portion of dough, formed from the mass of dough, from the pump chamber and into the second dough delivery conduit.

Preferably, a valve is arranged within a merger of the first and second dough delivery conduits, with the valve being configured to shift between a first valve position and a second valve position. In its first valve position, the valve allows only the first dough delivery conduit to communicate with a main delivery conduit, and in its second valve position, the valve allows only the second dough delivery conduit to communicate with the main delivery conduit. Thus, the valve allows the first portion of dough and the second portion of dough to form a stream of dough within the main delivery conduit as the valve shifts between its positions. In some embodiments, the valve is a flapper valve.

In accordance with another aspect of the present invention, a preferred method includes the steps of: (1) providing a mass of dough; (2) providing a length of dough delivery conduit; (3) detaching a first portion of dough from the mass of dough; (4) delivering the first portion of dough into the dough delivery conduit; (5) detaching a second portion of dough from the mass of dough; (6) delivering the second portion of dough into the dough delivery conduit to form a stream of dough within the dough delivery conduit; (7) passing the stream of dough toward a dough piercing sharp for dividing the stream of dough, and; (8) forming the stream of dough into a plurality of dough pieces.

In accordance with still another aspect of the present invention, an alternative method includes the steps of: (1) providing a pump chamber communicating with a mass of dough; (2) providing first and second dough delivery conduits communicating with the pump chamber, the first and second dough delivery conduits merging with and communicating with a main dough delivery conduit; (3) reciprocating a first piston and a second piston within the pump chamber, the first piston reciprocating between a first retracted position and a first extended position, the second piston reciprocating between a second retracted position and a second extended position; (4) moving the first piston to its first retracted position and the second piston to its second retracted position; (5) urging at least a portion of the mass of dough into the pump chamber; (6) moving the first piston toward its first extended position such that a first portion of dough is delivered from the pump chamber and into the first dough delivery conduit; (7) moving the second piston toward its second extended position such that a second portion of dough is delivered from the pump chamber and into the second dough delivery conduit, and; (8) arranging a flapper valve within a merger of the first and second dough delivery conduits, such that the flapper valve allows the first portion of dough and the second portion of dough to form a stream of dough within the main delivery conduit.

Other objects, features and advantages of the present invention will become apparent upon reading the following specification, when taken in conjunction with the accompanying drawings.

BRIEF DESCRIPTION OF THE SEVERAL VIEWS OF THE DRAWINGS

The accompanying drawings incorporated in and forming a part of the specification illustrate several aspects of the present inventions, and together with the description serve to explain the principles of the inventions. The components in the drawings are not necessarily to scale, emphasis instead being placed upon clearly illustrating principles of the present inventions.

FIGS. 6A–6C are partially cut-away, schematic diagrams depicting the operation of the pistons and valve assembly of the dough pump depicted in FIGS. 4 and 5.

DETAILED DESCRIPTION OF THE PREFERRED EMBODIMENT

Figure 1A:
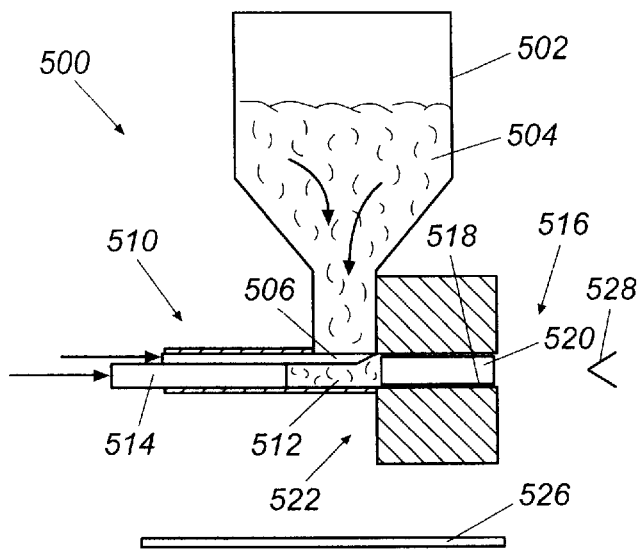
FIGS. 1A–1C are schematic diagrams illustrating the operation of a representative prior art ram and sheer apparatus.
Figure 1B:
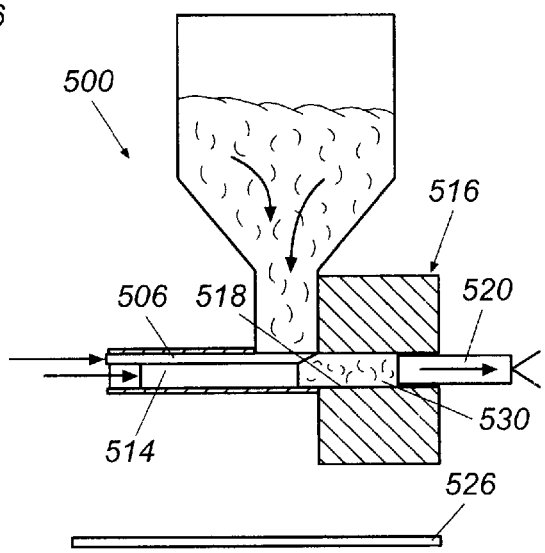
Figure 1C:
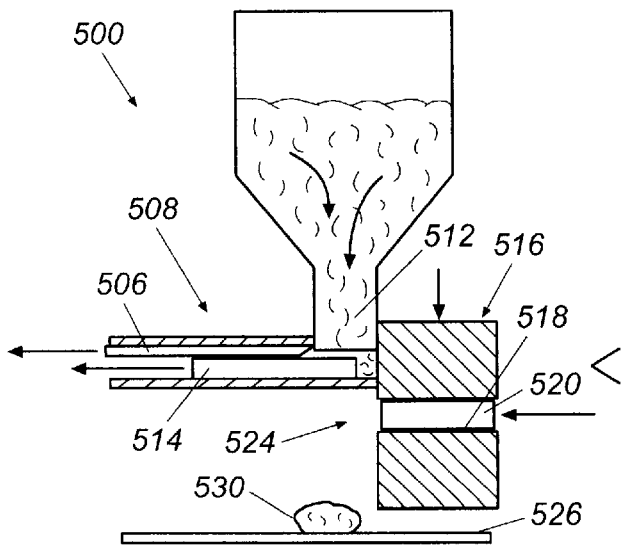
Figure 2:
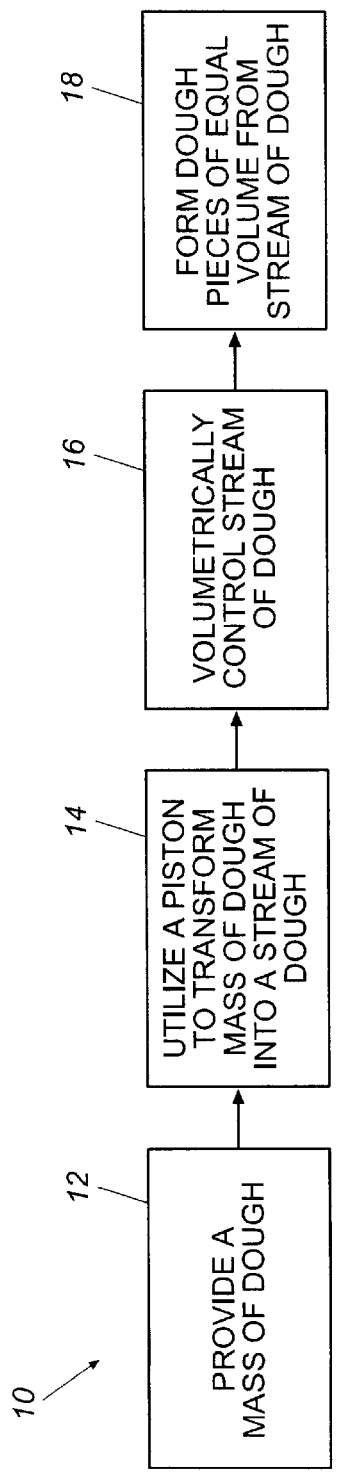
FIG. 2 is a block diagram illustrating a preferred method of the present invention.

Reference will now be made in detail to the description of the present invention as illustrated in the drawings with like numerals indicating like parts throughout the several views. As depicted in FIG. 2, a preferred method 10 of forming and dividing a dough stream includes the steps of providing a mass of dough (step 12), utilizing a piston to transform the mass of dough into a stream of dough (step 14), and volumetrically controlling the stream of dough (step 16). Additionally, the method can include the step of forming dough pieces of equal volume from the stream of dough (step 18). As described in greater detail hereinafter, the present invention produces the heretofore unexpected result of converting a mass of dough, which is particularly formulated for the production of specialty dough products, into a continuous flowing dough stream which is particularly suited for processing with extrusion-type dividers. As used herein, "specialty dough products" refers to products other than fine-grain bread products, such as Jewish rye, pumpernickel, hard rolls and whole wheat products, for example, and also includes products that are produced from doughs that are intended to be frozen prior to baking.

Figure 3:
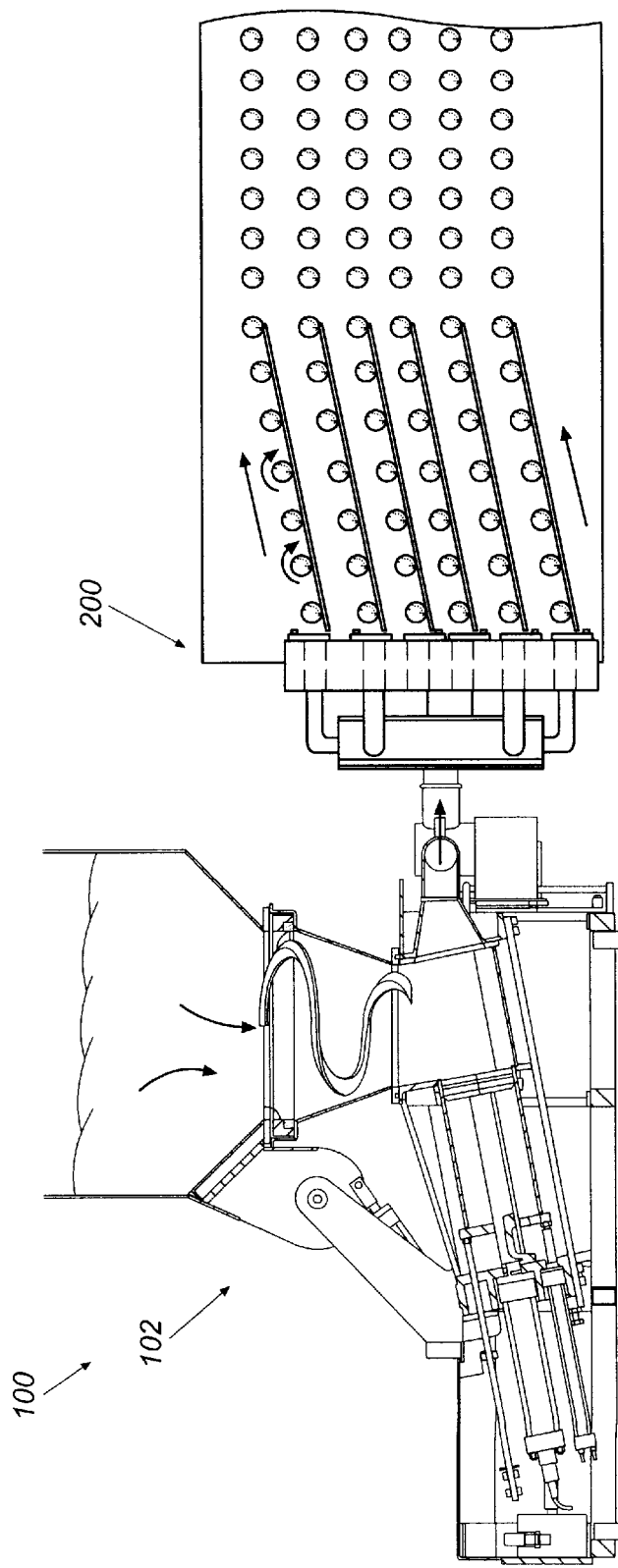
FIG. 3 is a schematic diagram illustrating a preferred embodiment of the present invention.

As shown in FIG. 3, a preferred embodiment of the dough processing system 100 of the present invention generally includes a dual piston pump apparatus 102, which provides a stream of dough to a dough divider 200. As described in relevant portion hereinafter, the dual piston pump apparatus 102 preferably is constructed in accordance with the teachings of U.S. Pat. No. 5,479,847, issued to Powers et al., and which is herein incorporated by reference, although other piston operated devices may be utilized. It is, however, considered important to the proper formation of the gluten structure of the specialty doughs being processed that the dough be shorn from a mass of dough and then compressed, such as by piston action into a delivery conduit, for delivery to downstream processing equipment.

Figure 4:
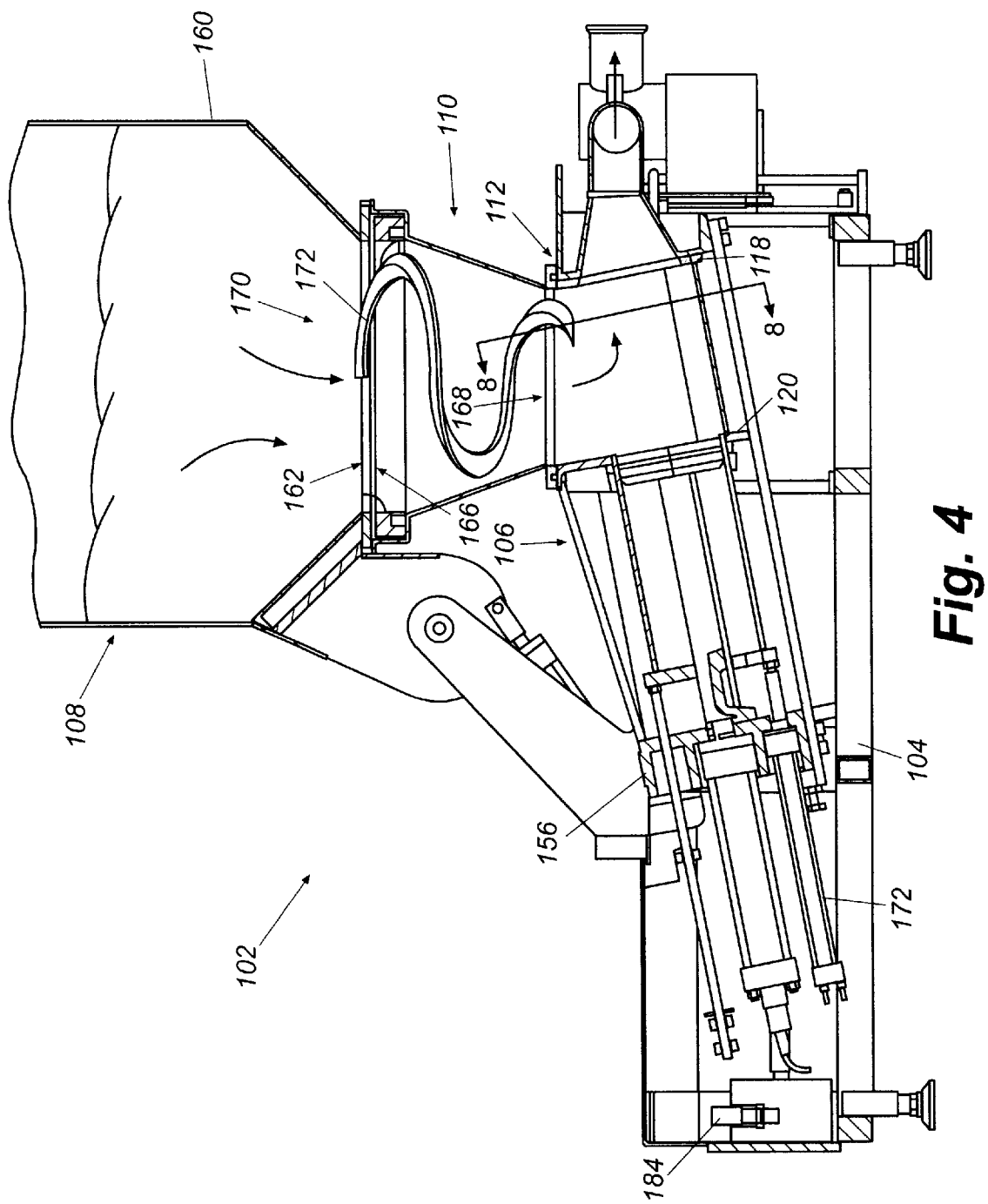
FIG. 4 is a partially cut-away, side view of a preferred embodiment of the dough pump utilized in the present invention.

FIG. 4. depicts a dual piston pump apparatus 102 constructed in accordance with U.S. Pat. No. 5,479,847, which is herein incorporated by reference, that includes a frame 104, a dual piston pump assembly 106 housed within the frame, a hopper assembly 108 supported on the Same over the pump, and a transfer assembly 110 provided between the hopper and the pump. The frame 104 defines a pump chamber 112 that is in fluid communication with a pair of side-by-side piston assemblies (114 and 116 of FIG. 5). The pump chamber 112 is formed by opposing front and rear walls, 118 and 120, which are spaced from one another, and a general U-shaped side wall (not shown) which forms the sides and bottom of the pump chamber.

Figure 5:
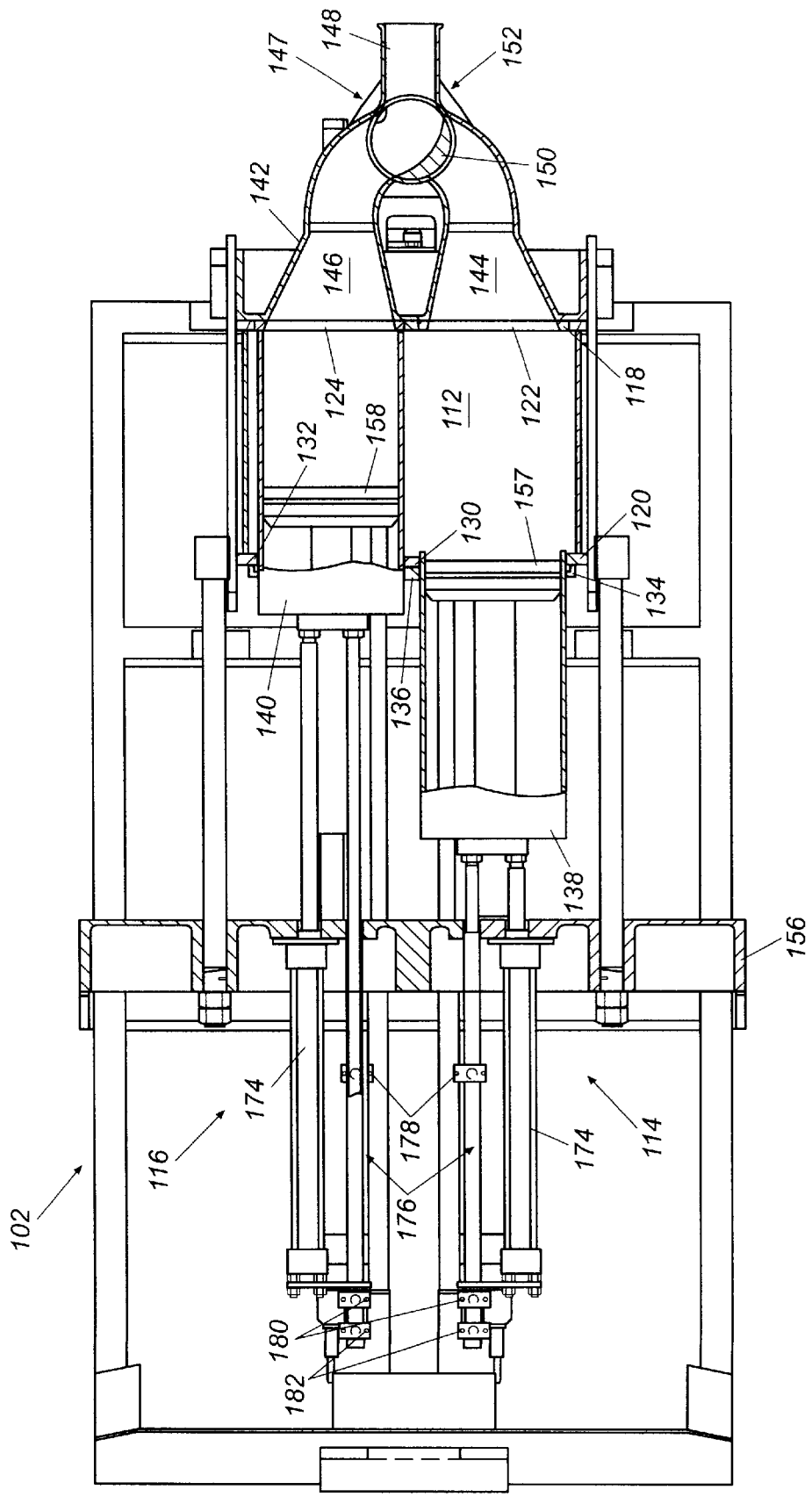
FIG. 5 is a partially cut-away, plan view of the embodiment of the dough pump shown in FIG. 4 showing detail of the pistons and valve assembly.

As illustrated in FIG. 5, the front wall 118 of the chamber includes a pair of side-by-side openings, 122 and 124, that define outlets of the chamber. The rear wall 120 also includes a pair of side-by-side openings, 130 and 132, with these openings receiving the piston assemblies, 114 and 116, so that they may reciprocate back and forth within the chamber 112 to pump dough through the outlet openings and from the apparatus. A collar, 134 and 136, is provided around each opening in the rear wall that receives a seal for sealing the space between the collar and the sleeve, 138 and 140, of each piston assembly.

An outlet assembly 142 is supported on the frame forward of the front wall of the chamber and includes a pair of outlet passages, 144 and 146, in communication with the openings, 122 and 124 respectively. Outlet passages 144 and 146 intersect within the outlet valve assembly 147 and are alternately brought into fluid communication with a main dough delivery conduit 148 by a valve rotor 150 that rotates between a first position 152, shown in FIGS. 5 and 6C, whereby outlet passage 144 communicates with the outlet valve assembly 147 and a second position 154, shown in FIG. 6A, whereby outlet passage 146 communicates with the outlet valve assembly 147. So configured, the valve rotor 150 blocks one of the passages while aligning with the other passage to allow that passage communicate with the main dough delivery conduit 148.

A mounting plate 156 is supported on the frame 104 to the rear of the pump chamber 112 and supports the two piston pump assemblies, 114 and 116, on the frame in alignment with the pump chamber, as well as guides reciprocating movement of the sleeves, 138 and 140, and pistons, 157 and 158, of the pump assemblies.

The hopper assembly 108 (FIG. 4) includes a large cylindrical vacuumizer housing 160 having an open top and a tapered lower end narrowing to a discharge opening 162 at the bottom of the housing. The housing is hollow and is adapted to receive and store the dough that is to be delivered by the dual piston pump apparatus 102. A lid (not shown) is supported over the open top of the housing and is pivotal between a closed, sealed position and an opened position exposing the interior of the housing. An inlet (not shown) is formed in the housing adjacent the upper end thereof and is adapted to receive dough from a supply source. A mixer (not shown) also can be provided within the hopper assembly to mix the product within the housing.

The transfer assembly 110 includes a hollow tapered housing having an open upper end 166 of a size corresponding to the discharge opening 162 of the hopper assembly and an open lower end 168 in fluid communication with the pump chamber 112. Preferably, an auger assembly 170 is provided within the housing for moving dough from the hopper 108 into the pump chamber, although use of the auger assembly may not required. The auger assembly 170 includes a tapered spiral auger 172 having an upper end protruding above the transfer assembly into the discharge opening of the hopper assembly and a lower end protruding through the open lower end of the transfer assembly into the pump chamber. The auger 172 is secured to a ring gear (not shown) that is intermittently driven by a suitable motor and gear assembly in timed relation to reciprocation of the piston pump assemblies, 114 and 116, to turn the auger within the housing.

Each piston pump assembly (114, 116) broadly includes a sleeve (138 and 140, respectively), a mechanism for reciprocating the sleeve back and forth through the pump chamber 112, a piston (157 and 158, respectively), and a mechanism for reciprocating the piston back and forth through the pump chamber within the sleeve. Each sleeve is of an elongated hollow tubular construction presenting front and rear axial ends and an internal surface adapted to receive its piston in sealing engagement. A vacuum system is also provided in association with the piston pump assembly for deaerating the dough in the pump chamber 112, and includes a line 184 (FIG. 4) extending between the apparatus and a vacuum pump (not shown). Additionally, a control system coordinates operation of the two piston pump assemblies, 114 and 116, so that they operate in unison to sequentially pump dough from the pump chamber 112 through each of the outlet passages, 144 and 146, to form a stream of dough.

The sleeve reciprocating mechanism preferably includes a pair of fluid-actuated cylinder assemblies 172 and 174. A position sensing assembly 176 is mounted on the frame 104 adjacent the upper cylinder assembly and functions to sense the position of sleeve. The sensing assembly includes three transducers or sensors 178, 180 and 182 supported at fixed locations on the frame. The three sensors are supported on the sleeve and each sensor senses the passage of the end of a gauge rod of the sleeve, as the sleeve is reciprocated back and forth within the pump chamber 112. Preferably, the forward sensor 178 is positioned on the sleeve to detect the end of the gauge rod when the sleeve is in the fully extended position and the middle sensor 180 is positioned to detect the end of the rod when the sleeve is in the fully retracted position. The rear most sensor 182 is positioned to sense the end of the rod when the sleeve is withdrawn from the chamber for cleaning. The signals generated by the sensors are used to control actuation of the cylinder assemblies, so that the operation of the two piston pump assemblies is coordinated.

In operation, dough typically is mixed in a large mixer (not shown) and is transferred to an elevator which dumps the dough into the hopper assembly 108. The dough is then conveyed to the pump chamber 112 of the apparatus by the auger 170, which rotates within the transfer housing 110. The dough is continuously mixed in the hopper and is intermittently moved by the auger into the pump chamber as the sleeves, 138 and 140, and pistons, 157 and 158, of the piston assemblies, 114 and 116, are retracted after each pumping motion.

As shown in FIGS. 6A–6C, pumping of the dough is initiated by movement of one of the sleeves (i.e. sleeve 138) toward its extended position (FIG. 6A). Following extension of the sleeve, its piston (e.g. piston 157) is extended the full length of the pump chamber (FIGS. 6B and 6C)so that dough within the sleeve is forced through its outlet passage (e.g. outlet passage 144), through the valve rotor 150, and into the dough delivery conduit 148 for delivery from the apparatus. Once motion of the piston is complete (FIG. 6C) the rotor 150 is turned to the other outlet passage 146, and the pumping sequence is repeated by the other piston pump assembly, with its sleeve 140 moving first to its extended position and with its piston 158 following to pump dough from the piston chamber through its outlet passage 146. After the sleeve and piston of each assembly are extended, each sleeve and piston its are retracted together. Thus, each stroke of the assembly covers the full length of the pump chamber, with sequencing of the pistons and valve rotor being controlled so that a continuous and steady flow of dough is provided. So configured, the dual piston pumping apparatus 102 is capable of providing a continuous flowing dough stream to extrusion-type dough processing equipment, such as a dough manifold 200, described in detail hereinafter.

Figure 7C:
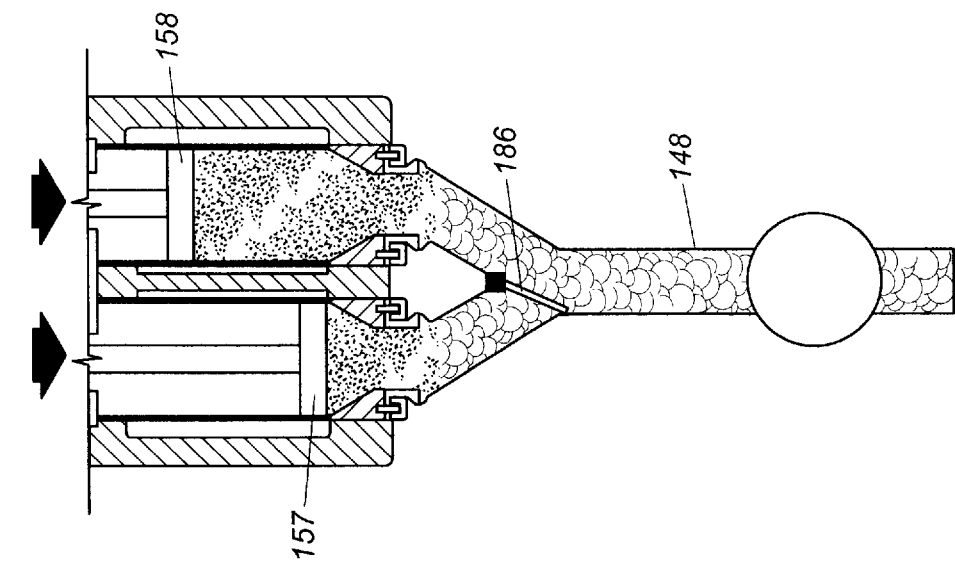
FIGS. 7A–7C are partially cut-away, schematic diagrams depicting the operation of an alternative embodiment of the dough pump incorporating a flapper valve and metering pump versus the valve assembly depicted in FIGS. 4–6C.
Figure 7B:
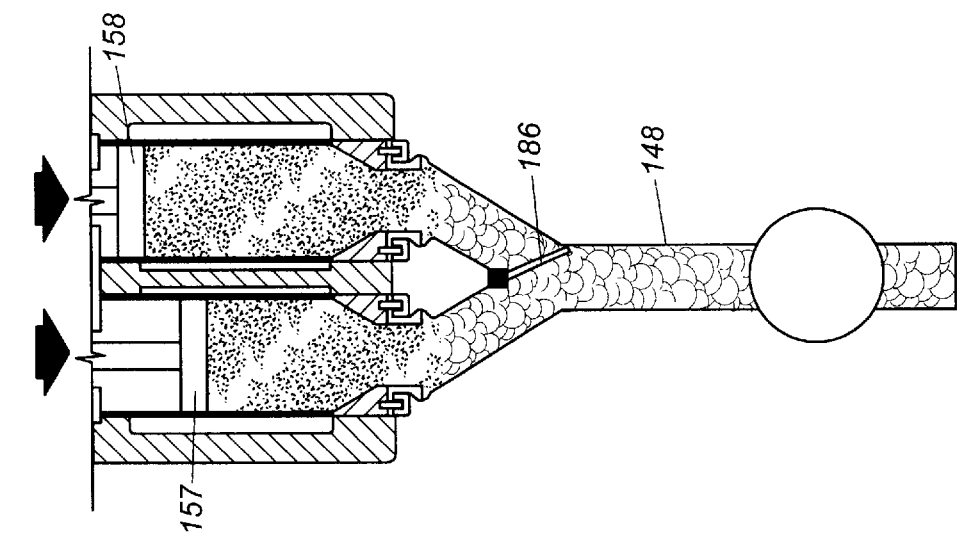
Figure 7A:
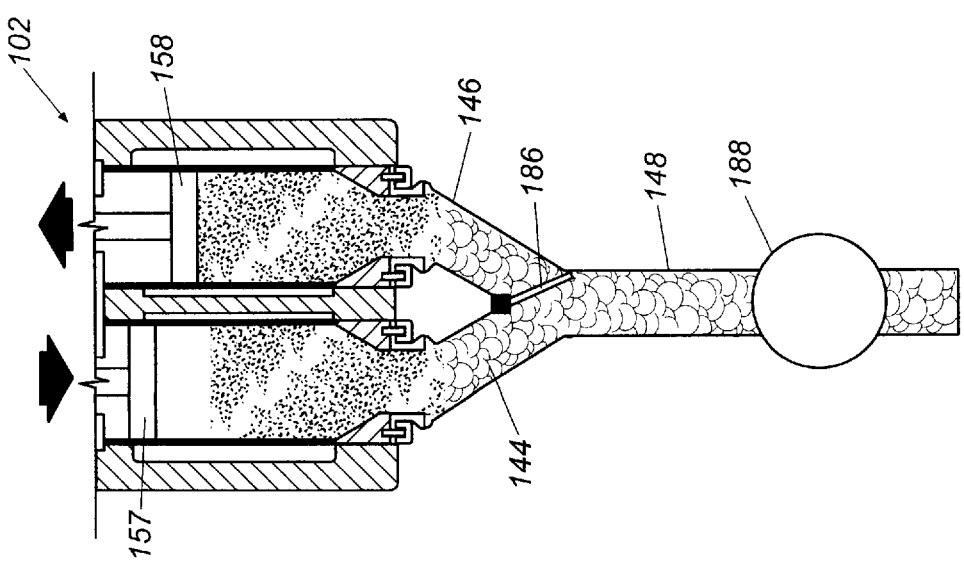

As shown in FIGS. 7A–7C, an alternative embodiment of a dual piston pump apparatus 102 is provided which does not incorporate the complex control mechanisms, i.e. the transducers, rotor and valve assembly, of the dual piston pump apparatus depicted in FIGS. 4–6C. The embodiment shown in FIGS. 7A–7C incorporates a flapper valve 186, in place of the rotor 150 and outlet valve assembly 147, that alternately connects and disconnects each outlet passage 144 and 146 to and from the dough delivery conduit 148. The flapper valve 186 preferably is an uncontrolled valve which is moved between its two positions, the first position (FIGS. 7A and 7B) connecting outlet passage 144 to the dough delivery conduit 148 and the second position (FIG. 7C) connecting outlet passage 146 to the dough delivery conduit, by the pressurized stream of dough being forced from the pump chamber. Therefore, as each piston moves forward to its extended position and forces a flowing stream of dough through its outlet passage, the stream of dough urges the flapper valve 186 to open relative to that outlet passage, thereby disconnecting the other outlet passage from the dough delivery conduit. Alternately, as the other piston extends, the flowing dough stream urges the flapper valve to move to its other position, thereby disconnecting the other outlet from the dough delivery conduit.

Since, in some embodiments (ie. the embodiments depicted in FIGS. 7A–7C), the steams of dough flowing from the outlet passages 144 and 146 converge within the dough delivery conduit in a relatively uncontrolled manner to form a single or main dough stream, the main dough stream preferably can be delivered to a metering pump 188, such as a Sign Pump manufactured by Sunstrand Fluid Handling Corp., and which is described in U.S. Pat. No. 4,575,324 (herein incorporated by reference), which regulates the dough stream so as to pass a specific volume of dough for a given time interval through the metering pump. This metered dough stream is then delivered to downstream processing equipment.

Figure 8:
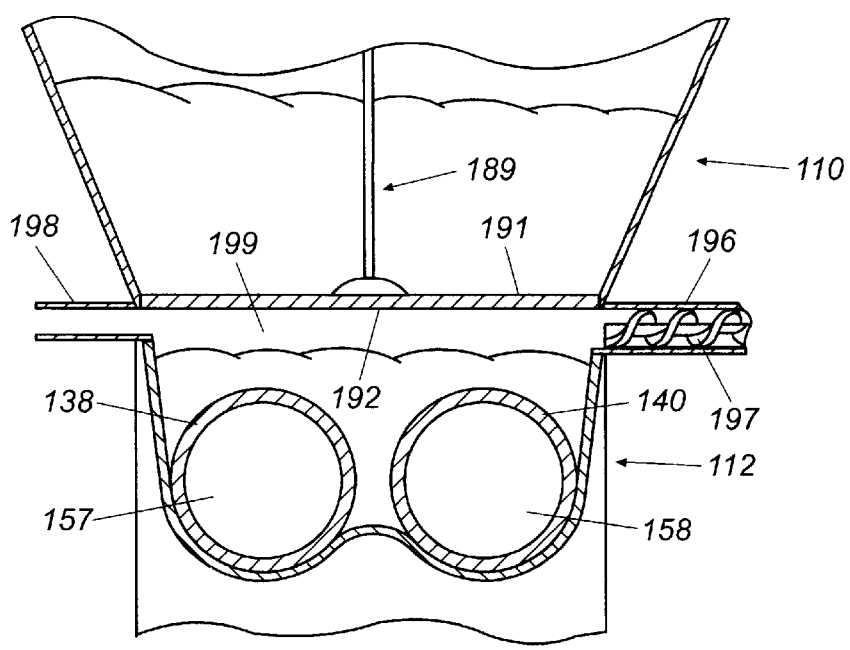
FIG. 8 is a partially cut-away, cross-sectional view of an alternative embodiment of the transfer assembly of the present invention.
Figure 9:
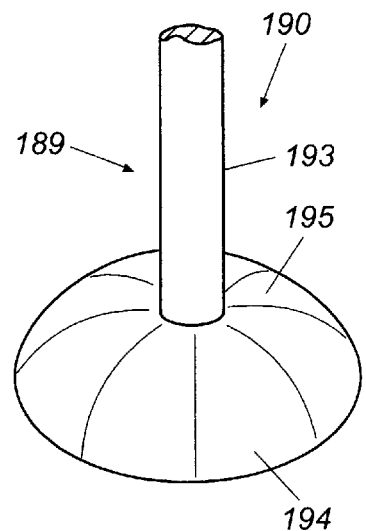
FIG. 9 is a partially cut-away, perspective view of a preferred embodiment of the plunger of the transfer assembly depicted in FIG. 8.

In order to properly prepare dough for downstream processing, oftentimes it is preferable to remove at least some of the gas which develops in the dough as the dough proofs. Therefore, in some embodiments of the dual piston pump apparatus 102, such as shown in FIG. 8, a plunger apparatus 189 (FIGS. 8–10) is incorporated within the transfer assembly 110. Plunger assembly 189 includes a plunger 190 which is reciprocated between a closed position (FIG. 8), where the plunger 190 cooperates with a floor 191 of the transfer assembly so that dough is retained within the transfer assembly 110, and an open position, depicted in FIG. 10, where the plunger 190 is disengaged from the floor 191 so that dough may be transferred from the transfer assembly 110 to the pump chamber 112 through a transfer orifice 192. A preferred embodiment of the plunger 190 (FIG. 9) includes a stem 193, which preferably is connected at its proximal end to a motor and drive assembly (not shown) for reciprocating the plunger 190 between its open and closed positions, and a blocking member or bell 194 arranged at its distal end. In the embodiment of the plunger depicted in FIG. 9, blocking member 194 incorporates a substantially hemispherical upper surface 195, which allows dough to transition smoothly from a position above the upper surface 195 to the transfer orifice 192 by flowing along the upper surface 195.

Figure 10:
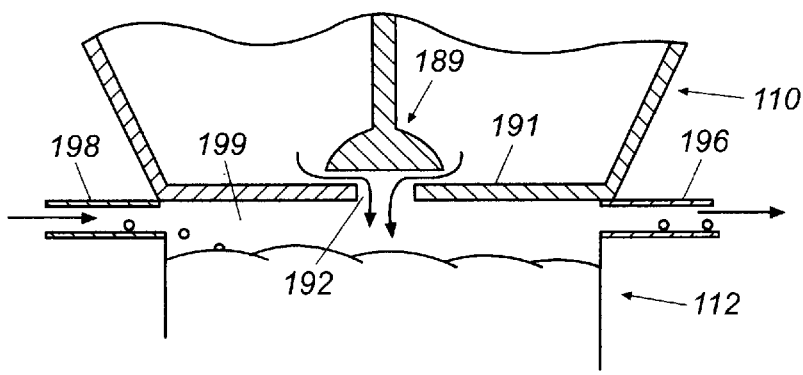
FIG. 10 is a partially cut-away, cross-sectional view of the transfer assembly depicted in FIG. 8, with the plunger shown in its open position.

As shown in FIG. 10, when the plunger 190 is moved to its open position, dough from the transfer assembly 110 is able to flow around the outer surfaces of the plunger and through the transfer orifice 192 and into pump chamber 112. As the dough flows through the transfer orifice 192, which can be formed in numerous sizes, shapes, and configurations, an increased outer surface area of the dough is presented to a partial vacuum in an upper portion of the pump chamber 112. Thus, some of the gas developed within the dough, i.e. gas trapped in the vicinity of the outer surface of the dough, is removed from the dough as the dough is transfered to the pump chamber.

As described hereinbefore, other embodiments of the dual pump apparatus 102 may not incorporate a transfer orifice 192, thereby allowing dough to be transferred from the transfer assembly 110 into the pump chamber 112 in a large chunk or mass of dough. Since the dough being transferred through the embodiments of the dual pump apparatus depicted in FIGS. 8 and 9 incorporate a transfer orifice 192, the chunk or mass of dough stored within the hopper and which is then provided to the transfer assembly 110 is drawn through the transfer orifice 192, thereby transforming the mass of dough into an elongated stream of dough having an increased surface area, as compared to the surface area of the aforementioned chunk or mass of dough.

The vacuum pressure in the upper portion of the pump chamber 112 is provided by a vacuum conduit 196 which communicates, at one of its ends, with the pump chamber 112, and at the other of its ends, with a suitable vacuum pump (not shown). So configured, a sufficient vacuum is provided in the upper portion of the pump chamber for at least partially degassing the dough as the dough passes through the transfer orifice 192 and into the pump chamber 112. Preferably, a screw-type pump 197 is provided within the vacuum conduit 196 adjacent the pump chamber 112 and is rotated so that any dough which is drawn toward and into the vacuum conduit 196 by vacuum pressure is urged out of and away from the conduit 196. Additionally, a dough-reentry conduit 198 also can be provided for allowing reentry of dough which is drawn into the vacuum conduit 196 to reenter the pump chamber 112.

As shown in FIGS. 8 and 10, a degassing area 199 is provided between the transfer assembly 110 and the upper surface of dough contained within the pump chamber 112, with the degassing area 199 being configured to expose the dough passing through the trasfer orifice and into the pump chamber to vacuum pressure for a sufficient period of time to allow for adequate degassing of the dough. Exposure time of the dough to the vacuum pressure can be adjusted, for instance, by altering the distance between the transfer orifice 192 and the upper level of the dough mass contained within the pump chamber.

Figure 11:
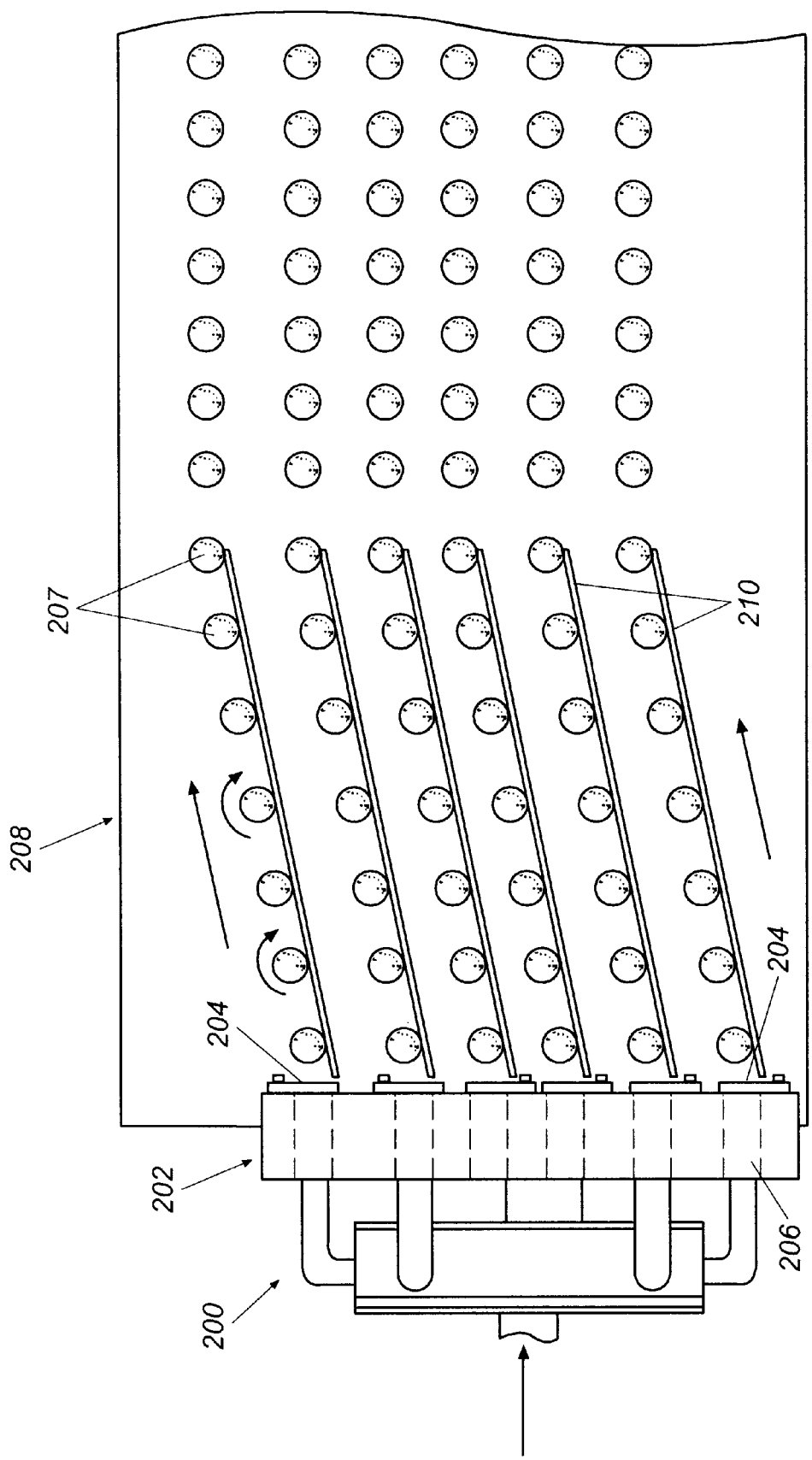
FIG. 11 is a schematic diagram illustrating a six-pocket version of a dough distribution manifold of the present invention cooperating with downstream dough processing equipment.

After departing a dual piston pump apparatus 102 or another suitable piston driven pump, the stream of dough is delivered to a dough distribution manifold 200, a preferred embodiment of which is shown in FIG. 11, and which is described in U.S. Pat. No. 5,264,232, herein incorporated by reference. As the stream of dough moves through the dough distribution manifold, the stream of dough is divided into multiple dough streams. Each of the dough streams then moves through a dough divider, such as dough divider 202, for instance, which includes a dough cutter blade 204 that sweeps across each opening 206 of the dough divider to cut the dough emerging therefrom into separate dough pieces 207. The dough pieces then drop onto the belt 208 of a surface conveyor which typically includes a plurality of rounder bars 210 which are suspended in a stationary position over the conveyor and in alignment with each dough piece. The rounder bars 210 function to contact and simulate rotation of the dough pieces 207 as they are drawn down the length of the rounder bars in order to develop the outer surface or skin of each dough piece.

Figure 12:
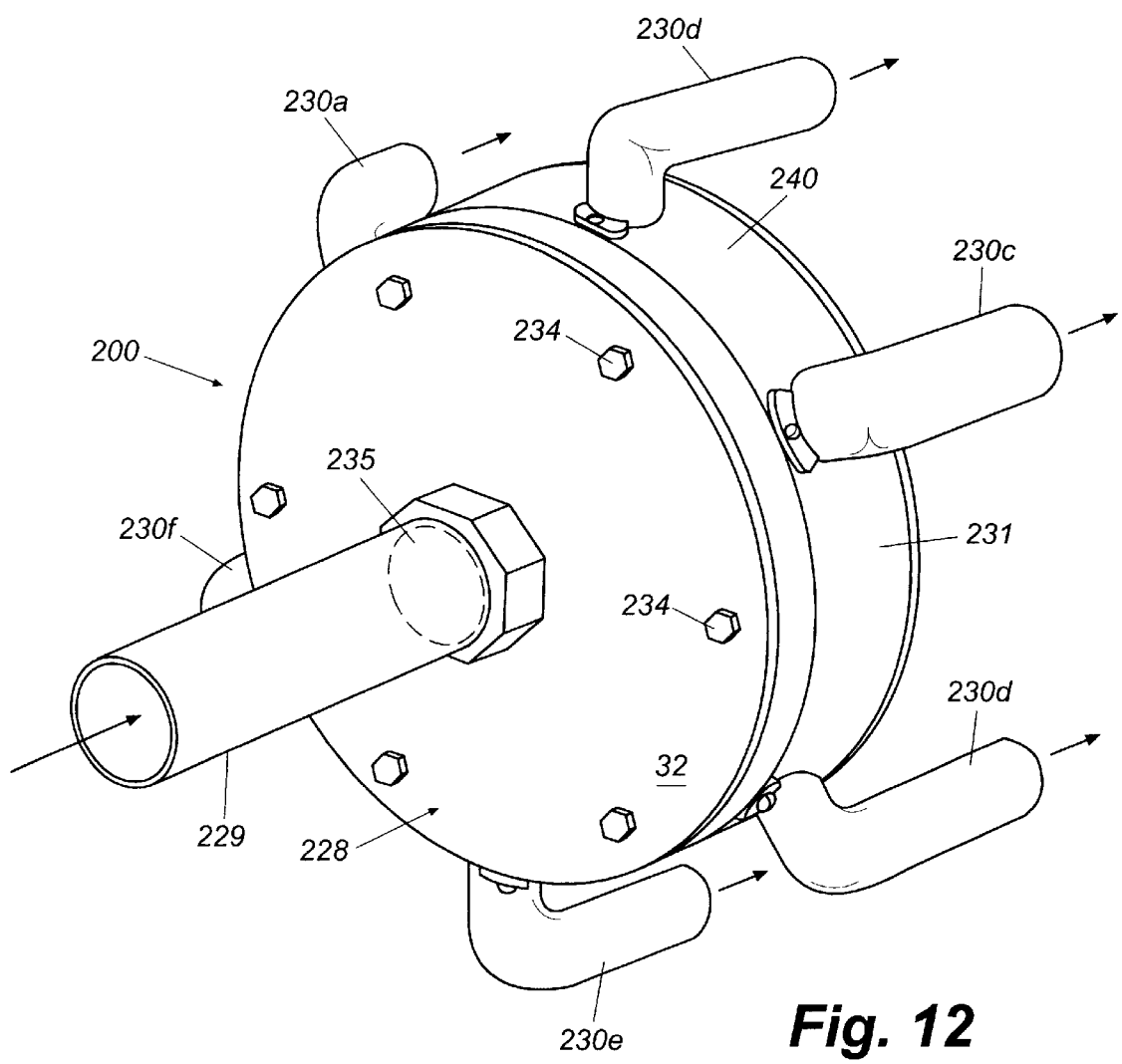
FIG. 12 is a perspective view illustrating the six pocket dough distribution manifold of FIG. 11.

FIG. 12 illustrates the exterior of the dough distribution manifold of FIG. 11, including housing 228, inlet conduit 229, and a series of outlet conduits 230a–230f which extend radially from the housing. Housing 228 includes base 231 and cover plate 232, with the cover plate being attached to the base by bolts 234. The inlet conduit 229 is mounted to an opening 235 formed in cover plate 232.

Figure 13:
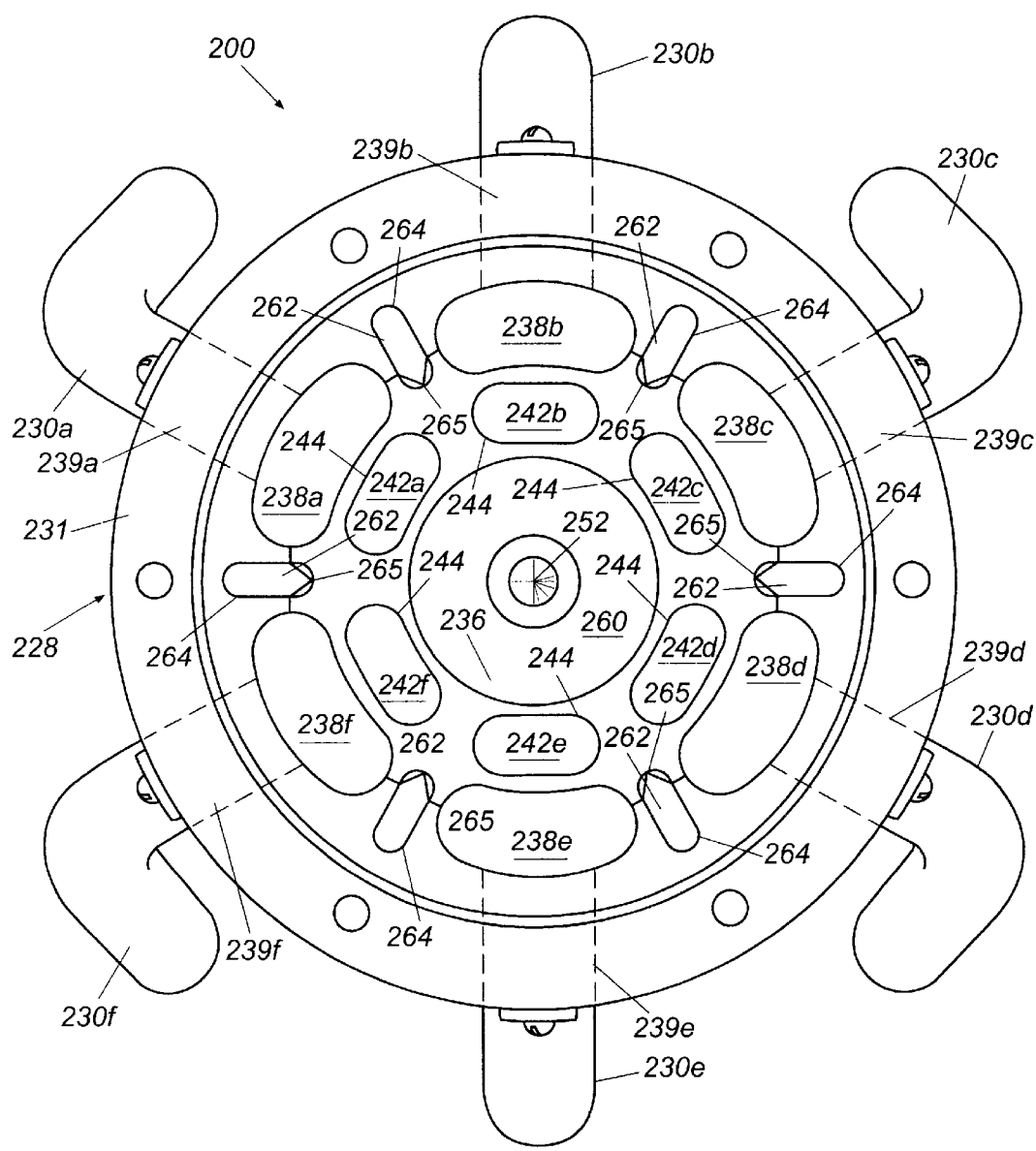
FIG. 13 is a front elevational view of the dough distribution manifold of FIG. 12 in cross-section.
Figure 14:
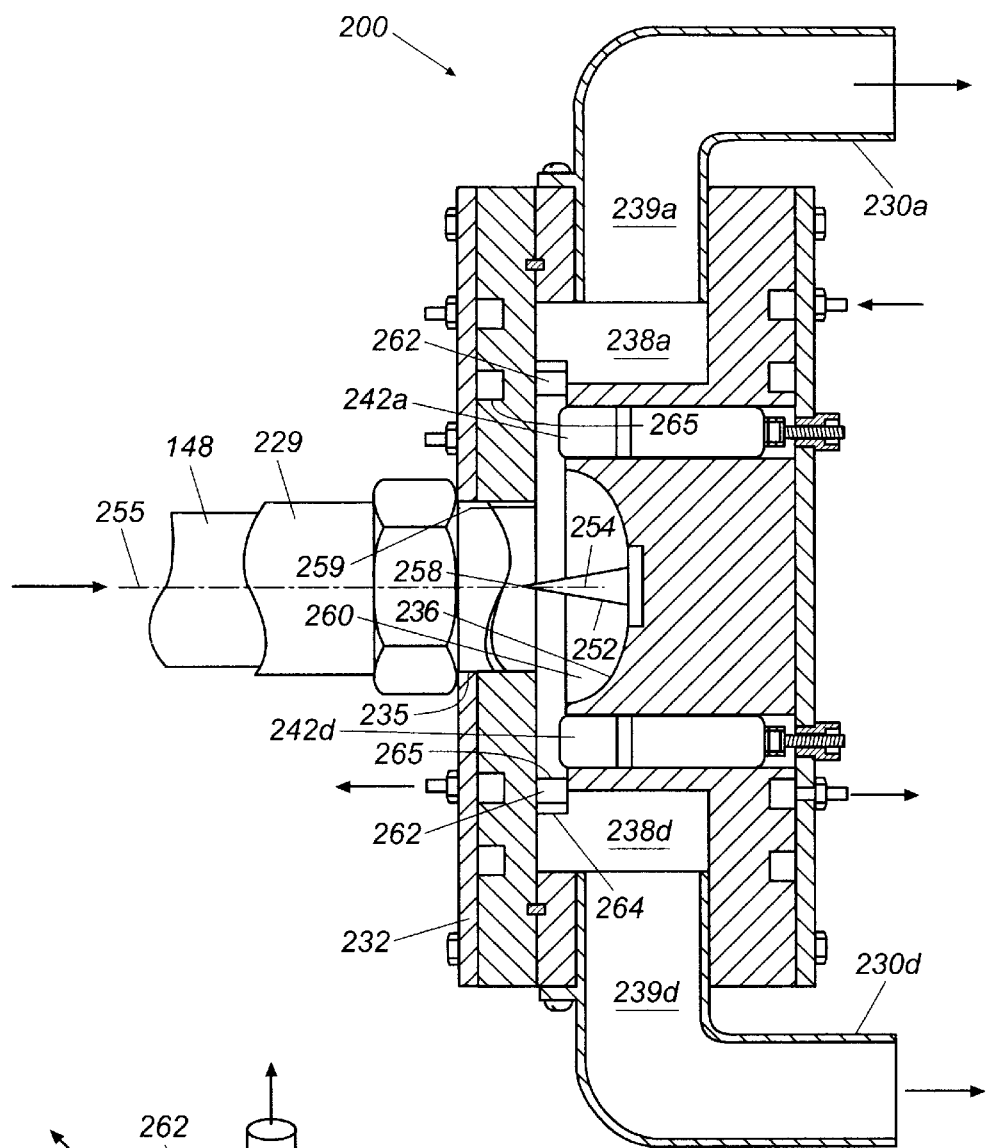
FIG. 14 is a side elevational view of the dough distribution manifold of FIGS. 11–13.

As shown in greater detail in FIGS. 13 and 14, base 231 of housing 228 includes a centrally positioned recess 236, circumferentially positioned outlet pockets 238a–238f radially extending outlet ports 239a–239f which extend from the outlet pockets to the cylindrical side wall 240 of housing 228. Each outlet conduit 230a–230f is mounted to and in communication with an outlet port 239a–239f, respectively. A plurality of adjustable dough deflectors 242a–242f are mounted in a circumferential array about the centrally positioned recess 236, with each deflector being aligned radially with a dough outlet pocket 238a–238f respectively.

A dough piercing sharp 252 is mounted in base 231 of housing 228 in alignment with inlet conduit 229. Dough piercing sharp 252 comprises a pointed spike with its longitudinal axis 254 aligned with the longitudinal axis 255 of inlet conduit 229. The interior pointed end 258 of spike 252 protrudes into the delivery end portion 259 of inlet conduit 229. The recess 236 formed in base 231 is concave, with its central portions surrounding spike 252 and forming an extension of the slope of the pointed end of the spike so that there is a substantially smooth transition from the pointed end 258 of the spike to the recess 236. The recess 236 curves so that its surface approaches cover plate 232 adjacent the dough deflectors 242a–242f.

A plurality of dough divider sharps 262 are spaced circumferentially around the base 231, between each outlet pocket 238a–238f. Each dough divider sharp 262 is received in a slot 264 formed in base 231 and each dough divider sharp has a slicing knife edge 265 facing the dough distribution chamber 260. The knife edge 265 of each divider sharp functions to slice the radially moving dough, as the dough expands radially from the distribution chamber 260 toward the outlet pockets 238a–238f.

Figure 15:
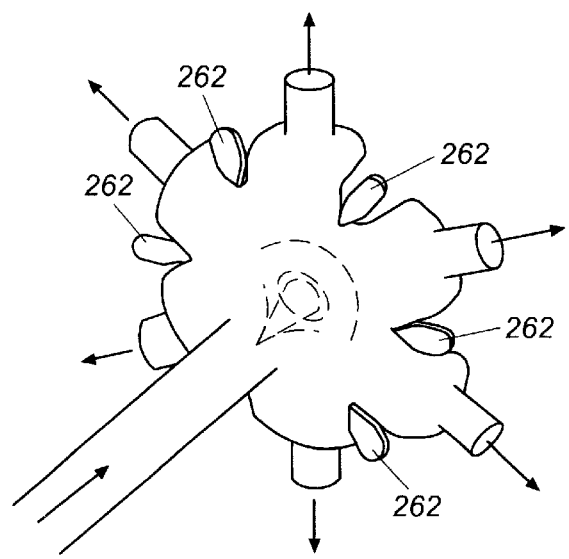
FIG. 15 is a perspective view illustrating the annulus of dough as the dough transitions from a dough stream into six separate dough streams.

As illustrated in FIG. 15, the dough piercing sharp 252 is oriented at the center of the oncoming metered dough stream, as the metered dough stream passes through the inlet conduit 229. The sharp tends to open the dough stream and deflect the dough radially with only a minimum of tearing and shearing of the dough so as to generally preserve the gluten structure of the dough as it makes this transition. The sharp positively locates the center of the annulus of dough and causes the dough on all sides of the sharp to be committed to flow radially away from the sharp. The dough then becomes formed in an annulus shaped structured which is thicker near the middle of the annulus and feathers out to a thinner shape near the perimeter of the annulus. As the dough reaches the perimeter of the annulus, the deflectors 242a–242f protrude inwardly of the space formed between the base 231 and the cover plate 232, forming a slight constriction and, therefore, a pressure drop in the dough as the dough moves from the distribution chamber 260 over the protruding ends of the deflectors. Further, as the dough moves into each outlet pocket 238a–238f, the radially expanding dough is sliced by the dough divider sharps 262, which are positioned between each outlet pocket. The slicing action of the dough divider sharps tends to avoid unnecessary stretching and tearing of the dough as the dough is divided into separate dough streams that enter each outlet pocket. Once the now divided dough streams reach an outlet pocket, the dough streams flow through their respective outlet ports 239a–239f and out of the dough distribution manifold 200 into delivery conduits 230a–230f. Each of the dough streams is then cut with a dough cutter blade 204 of a dough divider 202, that sweeps across each dough stream to cut the dough into separate dough pieces. The dough pieces are then progressed along the processing path for further processing.

Figure 16:
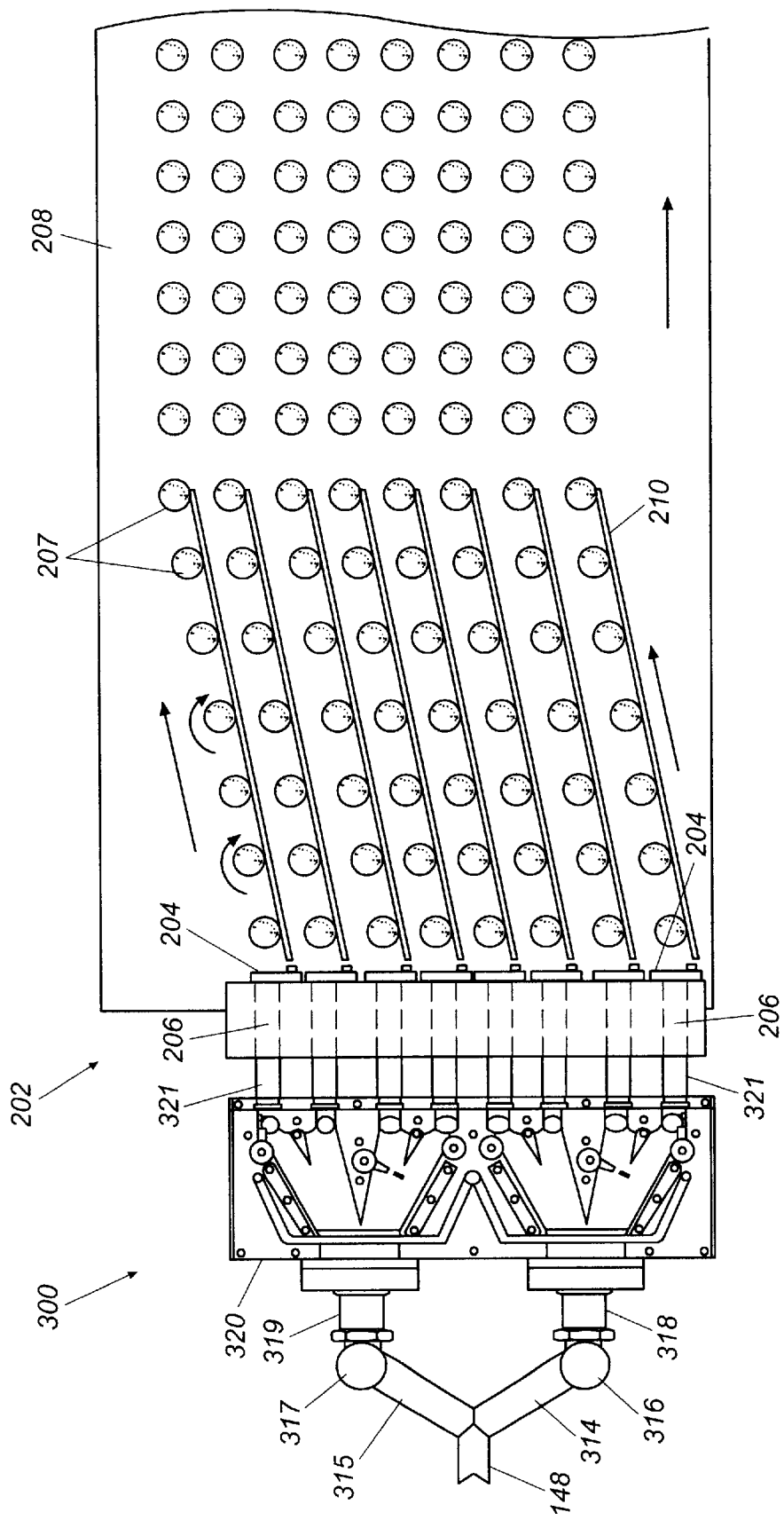
FIG. 16 is a schematic diagram illustrating an alternative embodiment of a dough distribution manifold of the present invention cooperating with downstream dough processing equipment.

As shown in FIG. 16, an alternative embodiment of the dough distribution manifold 300 is depicted, and which is described in U.S. Pat. No. 5,356,652, herein incorporated by reference. Prior to entering the dough distribution manifold 300, the oncoming stream of dough can be subdivided and provided to conduits, i.e. conduits 314 and 315, with each of the conduits delivering a subdivided stream of dough to a metering pump, e.g. pumps 316 and 317. The metering pumps 316 and 317 are provided to ensure that each subdivided dough stream is properly metered, thereby correcting any flow inconsistencies that may be formed during the subdivision. However, some embodiments do not require the use of the metering pumps, because the stream of dough can be subdivided to provide two or more metered streams of dough if pressure in the dough delivery conduit 148 and in the conduits 314 and 315 is properly maintained, i.e. at a pressure of at least approximately 40 psi.

From the metering pumps 316 and 317, the dough is passed through conduits 318 and 319, respectively, to a dough distribution manifold 320. The dough is then distributed from the manifold to each of a plurality of equal length conduits 321 and passed to a dough divider, such as dough divider 202, which divides each steam of dough into pieces of dough 207, as previously described.

Figure 17:
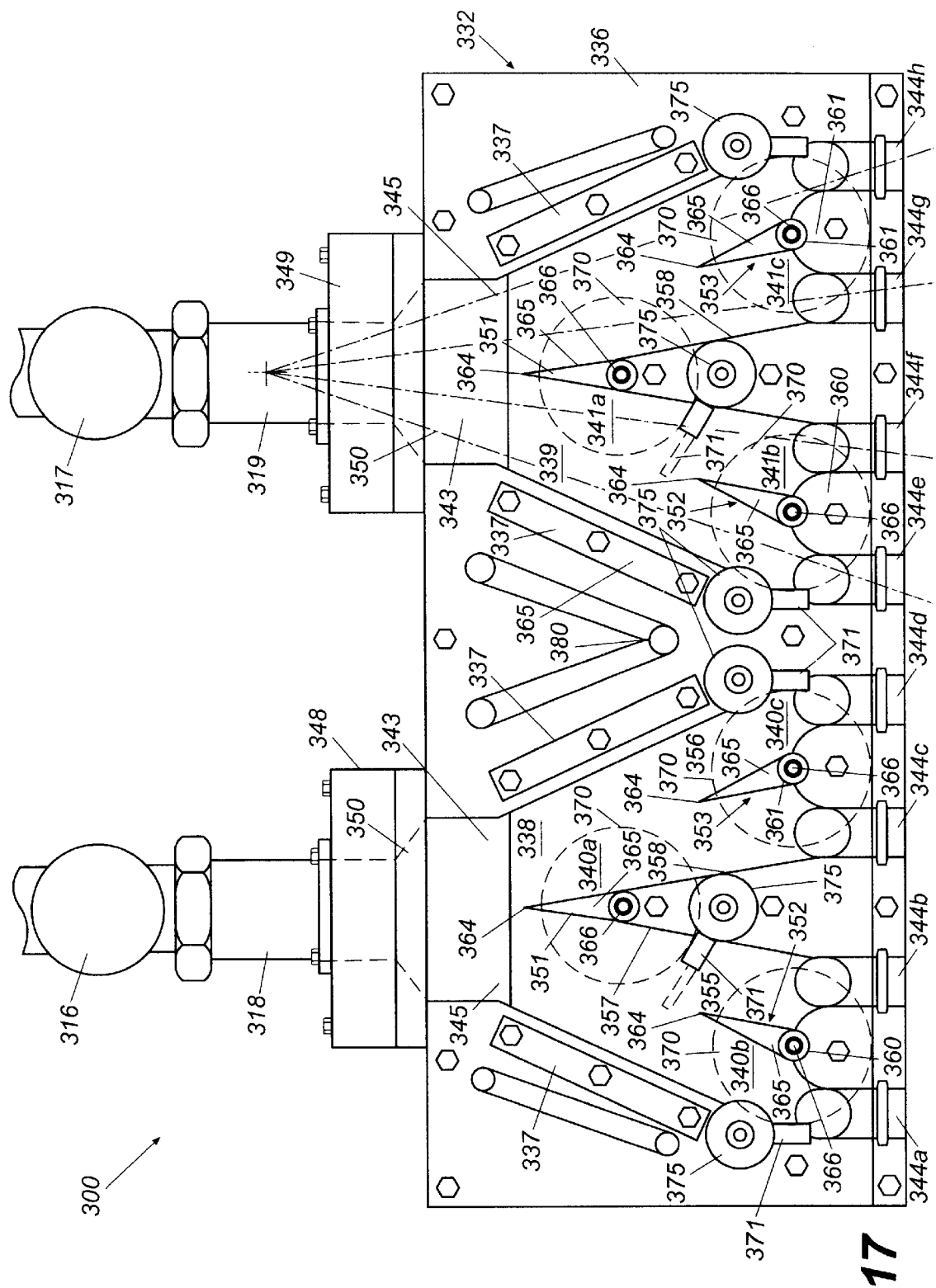
FIG. 17 is a plan view of the dough distribution manifold of FIG. 16.

As illustrated in FIG. 17, dough distribution manifold 320 includes a rectangular housing 332 incorporating a back wall 334, an intermediate wall 335, a transparent wall 336, and braces 337 which clamp the transparent wall 336 against the intermediate wall 335, so as to rigidify the transparent wall. Dough distribution chambers 338 and 339 are formed in intermediate wall 335 and gear chambers 340a–340c and 341a–341c are formed in back wall 334. Conduits 318 and 319 leading from the metering pumps 316 and 317 pass the streams of dough through a transition block 348 and 349. The transition blocks 348 and 349 each define a transition passageway 350 which merges from a circular shape adjacent the circular conduits 318 and 319 to a thin, wide-spread, noncircular shape entering the dog legs 345 and 346 and the dough distribution chambers 338 and 339.

Each dough distribution chamber 338 and 339 includes a first divider sharp 351 and a pair of second divider sharps 352 and 353. Dough distribution chambers 338 and 339 are each in an approximate pants leg shape, in that divider sharps 352 and 353 are located in what would be the leg portions 355 and 356 in the pants shape, whereas the first divider sharp 351 is located above the crotch portion 357 of divider wall 358 of the dough distribution chambers. Divider wall 358 forms the protrusion or crotch of the pants leg shape. Each leg portion 355 and 356 defines a secondary pants leg shape with the outlet openings 344a–344h communicating with the legs of the pant leg shapes and with the divider walls 360 and 361 forming subsequent crotch portions of the pants leg.

First divider sharps 351 are positioned immediately above the divider wall 358. The first divider sharps 351 are shaped in the form of a wedge shaped sharpened edge flat bladed knife having a sharpened rectilinear edge flat bladed knife having a sharpened rectilinear edge 364 facing inlet opening 343 and a wider base portion 365. A pivot pin 366 extends through the wider base portion 365 of each knife blade and can be rotated to control the position of each knife blade. The first knife blade 351 is of a dimension to fill the cavity which forms the dough distribution chamber 338 or 339 of the intermediate wall 335, thereby forming a central partition with the divider wall 358. Second divider sharps 352 and 353 are similarly shaped and are provided with pivot pins.

A bull gear 370 is positioned in each gear chamber 340a–340c and 341a–341c of the back wall 334, and the pivot pin 366 of each knife 351, 352, and 353 forms the axle of a bull gear, so that each knife tuns in unison with its bull gear 370. The peripheral teeth (not shown) of each bull gear 370 are engaged by a worm screw assembly 371 so that rotation of the worm screw assembly 371 tilts the knife 351–353. An end portion of each worm screw assembly 371 includes mating beveled gears 373 with one of the gears being mounted at the end of control shaft. The control shaft protrudes through alignment openings of the intermediate wall 335 and transparent wall 336, and an external knob 375 is mounted on the protruding end of the control shaft. With this arrangement, an operator can turn the external control knob 375, causing the bull gear 370 to displace the sharpened knife edge 364 of a knife 351–353 left or right within the dough distribution chamber.

In operation, as the dough streams are delivered from the metering pumps 316 and 317 to the dough distribution manifold 320, the dough streams are reconfigured from a circular cross sectional shape to a thin noncircular shape having its long cross sectional shape extending transverse to the rectilinear edge 364 of the first knives 351. The dough moves along lines of site, schematically indicated on FIG. 17 as LOS, directly from the inlet opening 343 of each dough distribution chamber toward outlet openings 344a–344d or 344e–344h, respectively, of the dough distribution chambers 338 and 339. As the stream of dough enters the dough distribution chambers 338 and 339, the first knives 351 slice the dough into a pair of diverging streams that straddle the first knives and the divider walls 358. The diverging streams of dough move through the pant legs portion of the dough distribution chambers toward the outlet openings 344a–344h. The diverging streams of dough then are confronted with the second knives 352 and 353 which perform a similar function of slicing the diverging steams of dough into second diverging streams of dough. The second diverging streams of dough move in straddling relationship on opposite sides of the knives 352 and 353 and divider walls 360 and 361 and toward outlet openings 344a–344h, and then through the outlet openings where the diverging streams of dough can be cut into globs of dough and deposited on the belt of a surface conveyor for further processing.

Cutting of dough pieces from the stream or streams of dough formed by the aforementioned processes can be performed by numerous devices, such as those described in U.S. Pat. Nos. 5,356,652, 5,270,070, 5,264,232, 4,948,611, 4,424,263 and 4,332,538, among others, with the suitability of such a device for use in the present invention being dependent upon its ability to continuously cut dough pieces from a moving stream of dough and, preferably, to deposit the dough pieces onto the upper surface of a belt of a surface conveyor for further processing along a dough processing path.

The foregoing description has been presented for purposes of illustration and description. It is not intended to be exhaustive or to limit the invention to the precise forms disclosed. Obvious modifications or variations are possible in light of the above teachings. The embodiment or embodiments discussed, however, were chosen and described to provide the best illustration of the principles of the invention and its practical application to thereby enable one of ordinary skill in the art to utilize the invention in various embodiments and with various modifications as are suited to the particular use contemplated. All such modifications and variations, are within the scope of the invention as determined by the appended claims when interpreted in accordance with the breadth to which they are fairly and legally entitled.

What is claimed is:

1. A method of forming and dividing a dough stream for processing by dough processing equipment, said method comprising the steps of:
   providing a mass of dough;
   providing a pump chamber communicating with said mass of dough;
   providing first and second dough delivery conduits communicating with said pump chamber, said first and second dough delivery conduits merging with and communicating with a main dough delivery conduit, said main dough delivery conduit communicating with dough processing equipment;
   reciprocating a first piston and a second piston within said pump chamber, said first piston reciprocating between a first retracted position and a first extended position, said second piston reciprocating between a second retracted position and a second extended position;
   moving said first piston to said first retracted position and said second piston to said second retracted position;
   urging at least a portion of said mass of dough into said pump chamber;
   moving said first piston toward said first extended position such that a first portion of dough is delivered from said pump chamber and into said first dough delivery conduit;
   moving said second piston toward said second extended position such that a second portion of dough is delivered from said pump chamber and into said second dough delivery conduit;
   arranging a flapper valve within a merger of said first and second dough delivery conduits, said flapper valve configured to pivot between a first valve position and a second valve position, in said first valve position said flapper valve allowing only said first dough delivery conduit to communicate with said main delivery conduit, in said second valve position said flapper valve allowing only said second dough delivery conduit to communicate with said main delivery conduit such that said flapper valve allows said first portion of dough and said second portion of dough to form a stream of dough within said main delivery conduit; and
   dividing the stream of dough into dough pieces.

2. The method of claim 1, wherein said main delivery conduit communicates with a metering pump such that said metering pump receives said stream of dough and converts said stream of dough into a volumetrically controlled stream of dough.

3. The method of claim 1, wherein the step of moving said first piston toward said first extended position comprises moving a first sleeve toward a first sleeve-extended position such that a first portion of dough is isolated within said pump chamber from said mass of dough and said first piston moves toward said first extended position by sliding within said first sleeve to deliver said first portion of dough into said first dough delivery conduit.

4. The method of claim 1, wherein the step of urging at least a portion of said mass of dough into said pump chamber comprises increasing a surface area of said portion of said mass of dough by drawing said portion of said mass of dough through a restriction, and then at least partially degassing said portion of said mass of dough.

5. A system for forming and dividing a dough stream comprising:
   a hopper assembly having a housing for receiving and storing a mass of dough, said housing having a discharge opening;
   a pump chamber communicating with said discharge opening such that said mass of dough can be drawn from said housing, through said discharge opening, and into said pump chamber;
   a main dough delivery conduit communicating with said pump chamber;
   a first dough delivery conduit having a first end communicating with said pump chamber and a second end;
   a second dough delivery conduit having a first end communicating with said pump chamber and a second end, said second end of said first dough delivery conduit communicating with said second end of said second dough delivery conduit;
   a flapper valve arranging within a merger of said first and second dough delivery conduits, said flapper valve configured to pivot between a first valve position and a second valve position, in said first valve position said flapper valve allowing only said first dough delivery conduit to communicate with said main delivery conduit, in said second valve position said flapper valve allowing only said second dough delivery conduit to communicate with said main delivery conduit;
   a first piston and a second piston arranged within said pump chamber, said first piston reciprocating between a first retracted position and a first extended position, said second piston reciprocating between a second retracted position and a second extended position such that moving said first piston toward said first extended position delivers a first portion of dough formed from said mass of dough from said pump chamber and into said first dough delivery conduit and moving said second piston toward said second extended position delivers a second portion of dough formed from said mass of dough from said pump chamber and into said second dough delivery conduit, said flapper valve allowing said first portion of dough and said second portion of dough to form a stream of dough within said main delivery conduit; and a dough divider for receiving the stream of dough from said main delivery conduit and dividing the stream of dough into separate dough pieces.

6. The system of claim 5, wherein said flapper valve is constructed and arranged to be movable between said first valve position and said second valve position by pressure exerted against said flapper valve by said first portion of dough and said second portion of dough.

7. The system of claim 5 further comprising a blocking member arranged between said hopper assembly and said pump chamber, said blocking member being movable between an open position and a closed position, in said open position, said blocking member being configured to allow said mass of dough to enter said pump chamber, and, in said closed position, said blocking member being configured to prevent said mass of dough from entering said pump chamber, and;

wherein a partial vacuum is maintained within at least a portion of said pump chamber such that, as dough of said mass of dough passes by said blocking member and into said pump chamber, said dough is at least partially degassed by said partial vacuum.

8. A method of forming and dividing a dough stream for processing by dough processing equipment, comprising the steps of:

urging a mass of dough into a pump chamber having first and second dough delivery conduits;

moving a first piston through the pump chamber toward the first dough delivery conduit and urging a first quantity of dough within said pump chamber with the first piston through the first dough delivery conduit;

retracting the first piston through the pump chamber away from the first dough delivery conduit and in response to retracting the first piston moving dough from the mass of dough into the pump chamber;

moving a second piston through the pump chamber toward the second dough delivery conduit and urging a second quantity of dough within the pump chamber with the second piston through the second delivery conduit;

retracting the second piston through the pump chamber away from the second dough delivery conduit and in response to retracting the second piston moving dough from the mass of dough into the pump chamber;

in response to the dough moving through the first delivery conduit blocking the flow of dough through the second delivery conduit with a flapper valve;

in response to the dough moving through the second delivery conduit blocking the flow of dough through the first delivery conduit with the flapper valve;

moving the dough from the first and second delivery conduits through a main delivery conduit and forming a continuous stream of dough; and dividing the stream of dough moved through the main delivery conduit into pieces of dough.

9. The method of claim 8, and further including the steps of:

prior to the first piston reaching the first delivery conduit, moving a first sleeve telescopically about the first piston and through the dough toward the first delivery conduit;

in response to moving the first sleeve toward the first delivery conduit filling the first sleeve with dough from the pump chamber;

prior to the second piston reaching the second delivery conduit, moving a second sleeve telescopically about the second piston and through the dough toward the second delivery conduit; and in response to moving the second sleeve toward the first delivery conduit filling the second sleeve with dough from the pump chamber.

10. The method of claim 8, and further including the steps of withdrawing gas from the pump chamber, and in response to withdrawing gas from the pump chamber inducing the flow of dough from the mass of dough into the pump chamber.

11. The method of claim 8, and further including the steps of:

delivering the dough from the first and second delivery conduits to a main delivery conduit; and controlling the flow of dough through the main delivery conduit with a metering pump.

* * * * *